United States Patent [19]
Christoph et al.

[11] 3,894,775
[45] July 15, 1975

[54] WHEEL COVERS

[76] Inventors: Erich Christoph, Birkenwaldstrasse, 16; K. Dieter Freytag, Birkenwaldstrasse, 18; Raimond Pell, Birkenwaldstrasse, 16, all of 6055 Hausen, Germany

[22] Filed: Feb. 14, 1974

[21] Appl. No.: 442,371

[52] U.S. Cl. .................. 301/37 TP; 301/37 P
[51] Int. Cl. ................................. B60b 7/00
[58] Field of Search ........... 301/37 P, 37 CM, 37 S, 301/37 B, 37 H, 63 PW, 37 TP, 108 R, 108 A; 24/201 S, 73 P, 73 HS

[56] References Cited
UNITED STATES PATENTS

| | | | |
|---|---|---|---|
| 2,173,544 | 9/1939 | Tinnerman | 301/108 R |
| 2,698,768 | 1/1955 | McLeod | 301/37 CM |
| 2,741,396 | 4/1956 | Lobl | 220/60 R |
| 2,758,498 | 8/1956 | Johnson | 220/60 R |
| 2,788,047 | 4/1957 | Rapata | 24/73 P |
| 2,937,834 | 5/1960 | Orenick et al. | 24/201 S |
| 2,973,226 | 2/1961 | Ellies | 301/37 P |
| 3,009,381 | 11/1961 | Rapata | 24/73 P |
| 3,262,352 | 7/1966 | Bedford, Jr. | 24/73 HS |
| 3,352,195 | 11/1967 | Fisher | 24/73 P |
| 3,537,756 | 11/1970 | Spisak | 301/108 R |

FOREIGN PATENTS OR APPLICATIONS

| | | | |
|---|---|---|---|
| 550,186 | 12/1957 | Canada | 301/37 CM |

*Primary Examiner*—M. Henson Wood, Jr.
*Assistant Examiner*—D. W. Keen
*Attorney, Agent, or Firm*—Harness, Dickey & Pierce

[57] ABSTRACT

A vehicle wheel cover having a plurality of inwardly directed projections which register with corresponding wheel openings and fastening means which lie on the axially inner side of the wheel passing through each wheel opening to connect with each projection. Various embodiments of the invention are disclosed.

15 Claims, 16 Drawing Figures

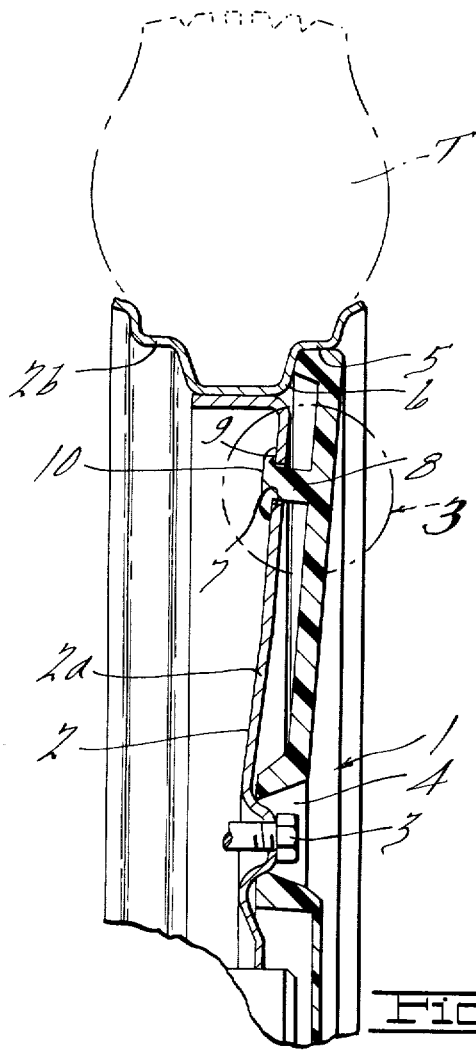
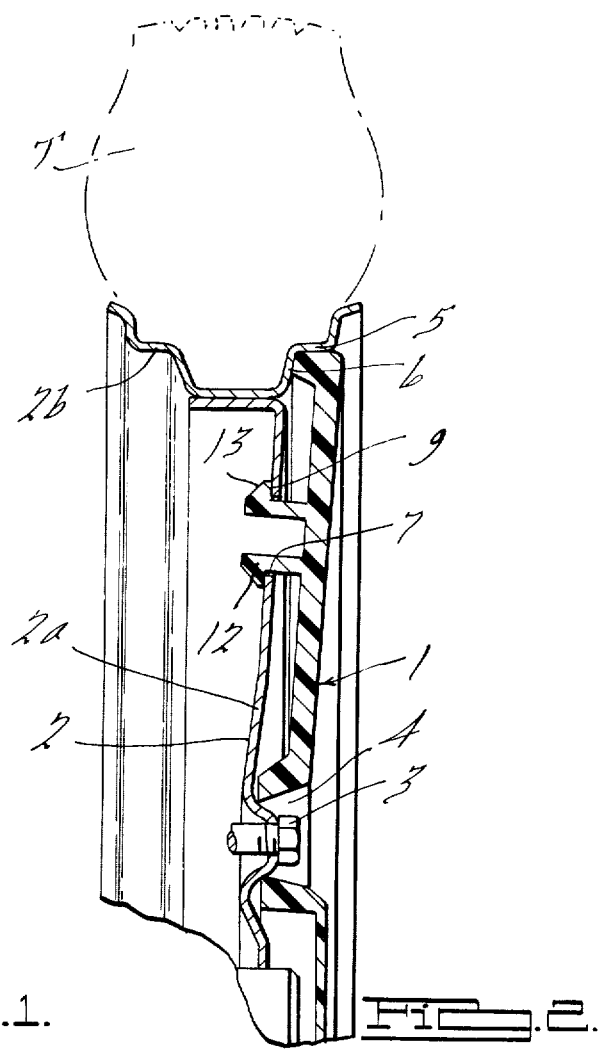
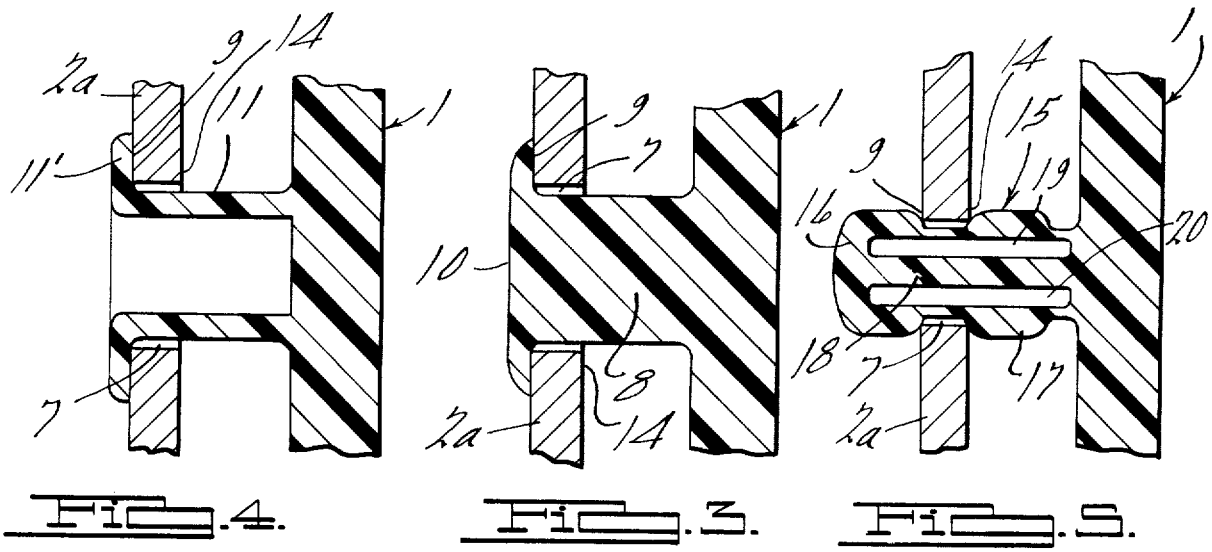

3,894,775

SHEET 2

WHEEL COVERS

BACKGROUND AND SUMMARY OF THE INVENTION

The present invention relates generally to decorative wheel covers for vehicle wheels and in particular to improvements in mounting wheel covers on vehicle wheels.

There are many known ways for mounting wheel covers on vehicle wheels. Frequently used are fasteners which permit a wheel cover to snap onto and off of a wheel thereby making it possible for the wheel cover to be removed from and reapplied to the wheel. One disadvantage of the snap-on, snap-off type cover is that the rim is in danger of being gouged by the fasteners. A further disadvantage is that removal of the cover is necessary when the wheel is to be changed.

One object of the present invention is to provide a novel wheel cover which can be mounted on a vehicle wheel in a facile manner and which furthermore precludes the necessity of removing the cover from the wheel when the wheel is to be changed.

In a preferred embodiment of the invention, a substantially full wheel cover is disposed on the axially outer face of a vehicle wheel with the outer periphery of the cover bearing against the wheel rim. The cover is permanently mounted by means of axially inwardly directed projections thereon, each of which projects axially inwardly toward a corresponding opening in the wheel disc. A fastening means extends axially outwardly through each wheel disc opening to connect with the corresponding wheel cover projection whereby the fastening means serve to retain the wheel cover on the wheel. Each fastening means may be either a separate part or fashioned integrally with the wheel cover projection. The existing bolt-hole pattern in the wheel disc, via which the wheel mounts to the vehicle axle, is rendered accessible for tightening and loosening the wheel mounting fasteners by the provision of suitable clearance holes in the wheel cover. Hence, the wheel may be removed from and reapplied to the axle without the necessity of removing the cover from the wheel. As a further feature, the wheel cover may have an overall diameter somewhat less than the overall diameter of the wheel rim to thereby provide free space at the outer rim terminal flange for attaching wheel balancing weights.

Additional features and advantages of the invention, along with those already enumerated, will be seen in the ensuing description and claims which are to be taken in conjunction with the accompanying drawings. The drawings illustrate preferred embodiments of the invention in accordance with the best mode presently contemplated for carrying out the invention.

BRIEF DESCRIPTION OF THE DRAWINGS

FIG. 1 is a partial sectional view through a vehicle wheel including a wheel cover in accordance with principles of the present invention mounted thereon.

FIG. 2 is a view similar to FIG. 1 illustrating a further embodiment of the invention.

FIG. 3 is an enlarged plan view of a tongue taken approximately in circle 3 in FIG. 1.

FIGS. 4–14 are views similar to FIG. 3 illustrating further embodiments of the invention.

BRIEF DESCRIPTION OF THE PREFERRED EMBODIMENT

Figure 6:
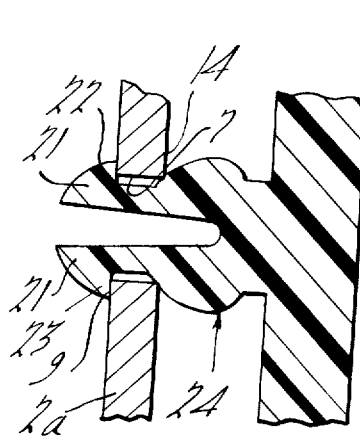

In FIG. 1, a wheel cover 1 embodying principles of the present invention is shown mounted on a conventional metal vehicle wheel 2 which comprises a central disc 2a and a tire receiving rim 2b receiving a tire T. Preferably, wheel cover 1 is a molded plastic wheel cover which may be formed from known materials using known fabrication techniques. Plastics may be used which permit an aluminum or magnesium character to be imitated, and, hence, the wheel cover 1 can be a simulated "mag style" wheel cover. Wheel cover 1 is provided with a plurality of clearance holes 4 in a pattern matching and aligned with the existing bolt-hole pattern in wheel disc 2a. Wheel 2 is mounted on an axle, for example, by means of bolts 3 passing through the wheel bolt holes. Clearance holes 4 provide adequate clearance for tightening and loosening bolts 3 when the wheel is applied to or removed from the axle. The outer periphery of wheel cover 1 bears against wheel rim 2b, lying against both an annular axial flange 5 and a conjoining annular radial flange 6. If desired, the overall diameter of cover 1 may be somewhat less than the overall diameter of the outer terminal flange of wheel rim 2b whereby a space is provided which permits conventional wheel balancing weights to be mounted on the terminal flange of the rim on the axially outer face thereof. Wheel cover 1 is further supported on the wheel disc around each of the bolt holes therein by suitable inward annular projections fashioned in the cover around each clearance hole 4.

In accordance with principles of the present invention, wheel 2 is provided with a plurality of openings 7 therein, preferably in wheel disc 2a as shown. Wheel cover 1 includes a plurality of inwardly directed solid projections 8, each aligning with an opening 7. Each projection 8 includes at the free end thereof a solid formed head 10 which is disposed behind (i.e., at the axially inner face) of disc 2a to grip the wheel disc around the inner edge 9 of opening 7 in securing wheel cover 1 on wheel 2. Where wheel cover 1 is fabricated from plastic, the projections 8 and the head 10 are advantageously fashioned integrally with the wheel cover. Each head 10 is formed after the cover has been applied to the wheel by a suitable amount of material at the free end of projection 8 which is subsequently formed into head 10, for example, by hot upsetting. The illustrated arrangement provides a secure and sturdy attachment.

The embodiment of FIG. 2 is very similar to that of FIG. 1, and like parts are identified by like numerals. The embodiment of FIG. 2 differs from that of FIG. 1 in that attachment at each opening 7 is provided by snap-on catches 12 which project inwardly from and are integrally fashioned with the wheel cover 1. The catches 12 are provided with inclined leading faces 13 which cause the catches to be initially deflected inwardly to clear the opening 7 upon application of the wheel cover to the wheel. When the catches clear the opening, they snap outwardly to grip behind the inner edge 9 around opening 7 and thereby securely retain and mount the wheel cover on the wheel.

The embodiment of FIG. 4 is virtually identical to that of FIG. 3 except that the projection 11 and the head 11' are of annular shape rather than being solid throughout.

A common characteristic of the remaining embodiments of the invention as disclosed in FIGS. 5-14 is that retention of the wheel cover is effected by the attaching structure gripping the wheel disc on both sides thereof around each opening 7. In FIG. 5, an enlarged head 16 on projection 15 grips behind the inner edge 9 of opening 7, and an enlarged intermediate section 17 grips the outside edge 14 of opening 7. This provides a bolt-like projection having a central cross piece 18 and at least one, but preferably two, slots 19 and 20.

In the embodiment shown in FIG. 6, the projection includes an enlargement 24 which grips outer edge 14 around opening 7 and a pair of inwardly directed expanding legs 21 which project from enlargement 24 through the opening 7 and include catches 22 and 23 which grip the inside of the disc around opening 7. The embodiment of FIG. 6 is similar to that of FIG. 2 in that the cover may be snapped onto the wheel by inserting the projections through the openings so that the catches lock behind the wheel disc. It will be noted that the free end of the catches are chamfered to facilitate assembly of the cover onto the wheel.

Figure 7:
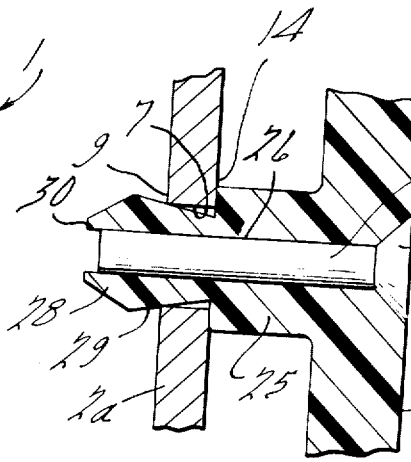

In the embodiment of FIG. 7, a bore 26 extends completely through projection 25 and the cover. An expanding mandrel 27 is inserted into bore 26. Projection 25 includes a shoulder bearing against the outside 14 of the disc and a tip 28 which extends through opening 7 to grip behind the wheel disc. The tip 28 has a section diverging outwardly from the shoulder of the projection and a converging section at the forward end of the tip. The expanding mandrel 27 is driven into bore 26 from outside to expand tip 28 so that the divergent portion of the tip grips behind the inner edge 9 of the opening 7. The expanding mandrel may include a countersunk head 32 which is received in a corresponding counter-sink provided in the wheel cover.

Figure 8:
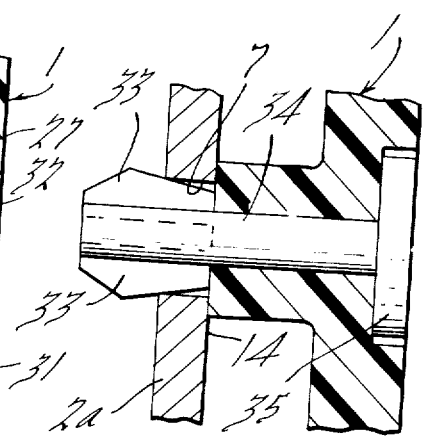

In the embodiment of FIG. 8 which is, in some respects, similar to the embodiment of FIG. 7, an expanding mandrel 34 having a head 35 of uniform thickness is used. Furthermore, the projecting tip consists of several legs 33 which are expanded by the mandrel to grip the inner edge of the opening 7.

Figure 9:
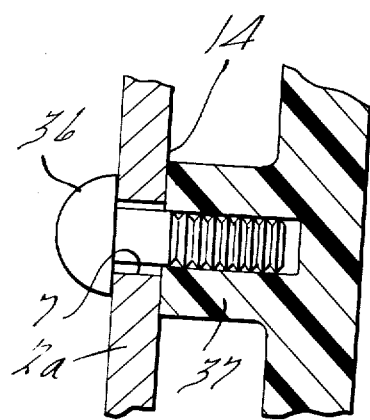
Figure 10:
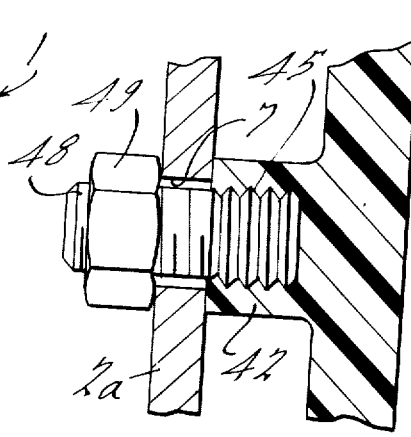
Figure 11:
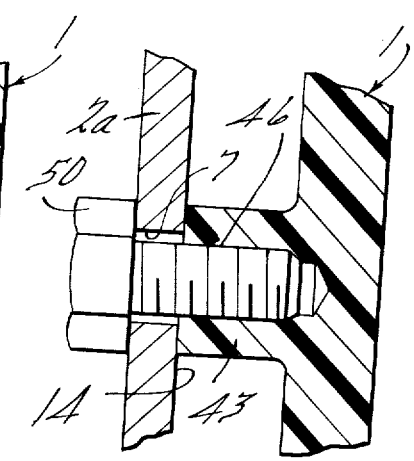

The embodiments in FIGS. 9-14 provide a concealed attachment. In FIG. 9, the inner end of projection 37 bears against the outside 14 of disc 2a and a bore is provided in the projection with the bore being open at the inner end of the projection but not extending through to the outer face of the wheel cover whereby the wheel cover conceals the entire attachment. A headed screw or bolt 36 is driven into the bore of the projection from the inside of the wheel disc to fasten the wheel cover on the wheel. In FIG. 10, attachment is effected by means of a stud 48 and a nut 49 which is passed through opening 7 from the rear of the disc and into the bore 45 of the projection 42. In FIG. 11, a self-tapping screw 50 is threaded into the bore 46 of projection 43 to provide the attachment.

Figure 12:
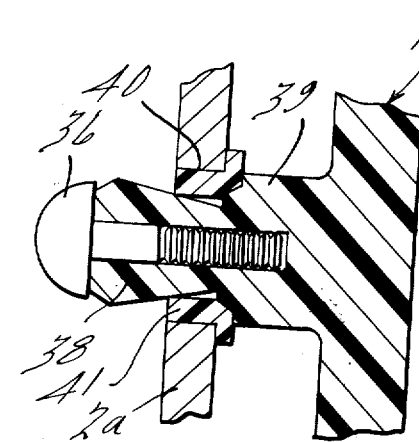

In FIG. 12, the attachment is very similar to that shown in FIG. 7 except that a bearing case 41 is disposed around the expanding tip 38 and inserted into the wheel disc opening 40. A screw or bolt 36 is driven into the bore passing through the tip 38 and the projection 39. The projection 39 bears against the bearing case 41 which in turn bears against the outside of the wheel disc around opening 40. This form of construction, by using bearing case 41, provides an improved fit for mounting the wheel cover on the wheel.

Figure 14:
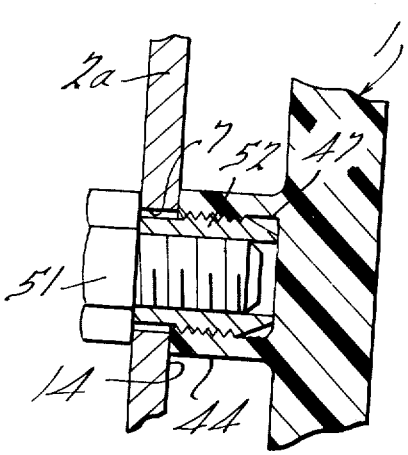

The embodiment of FIG. 14 is similar to that of FIG. 11 with the exception that an expandible sleeve 52 is inserted into the bore 47 of the projection 44 and a screw 51 is inserted into the expandible sleeve 52 to provide an improved fit.

Figure 13:
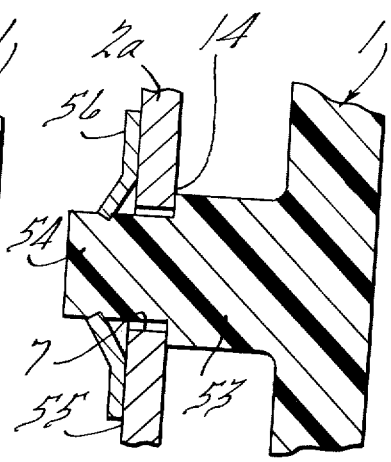

In the embodiment shown in FIG. 13, projection 53 bears against the outside of the wheel disc around opening 7 and includes a tip 54 extending through the opening onto which a spring-loaded lock nut 56 is inserted, the lock nut lying against the inside 55 of the rim.

Figure 15:
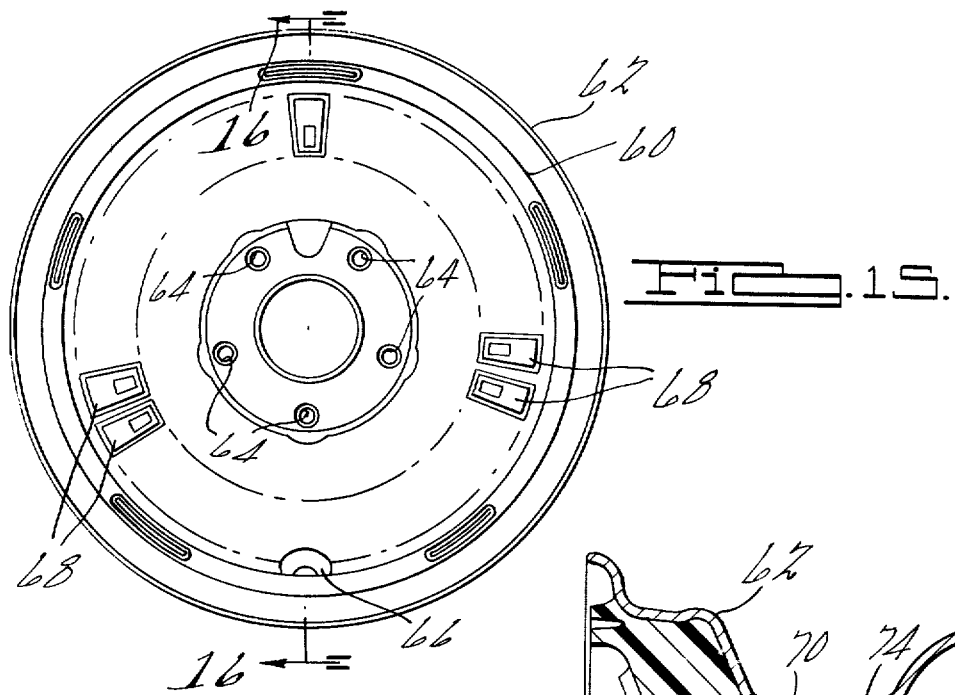
FIG. 15 is a view of the axially outer face of another wheel cover mounted on a wheel in accordance with principles of the present invention.
Figure 16:
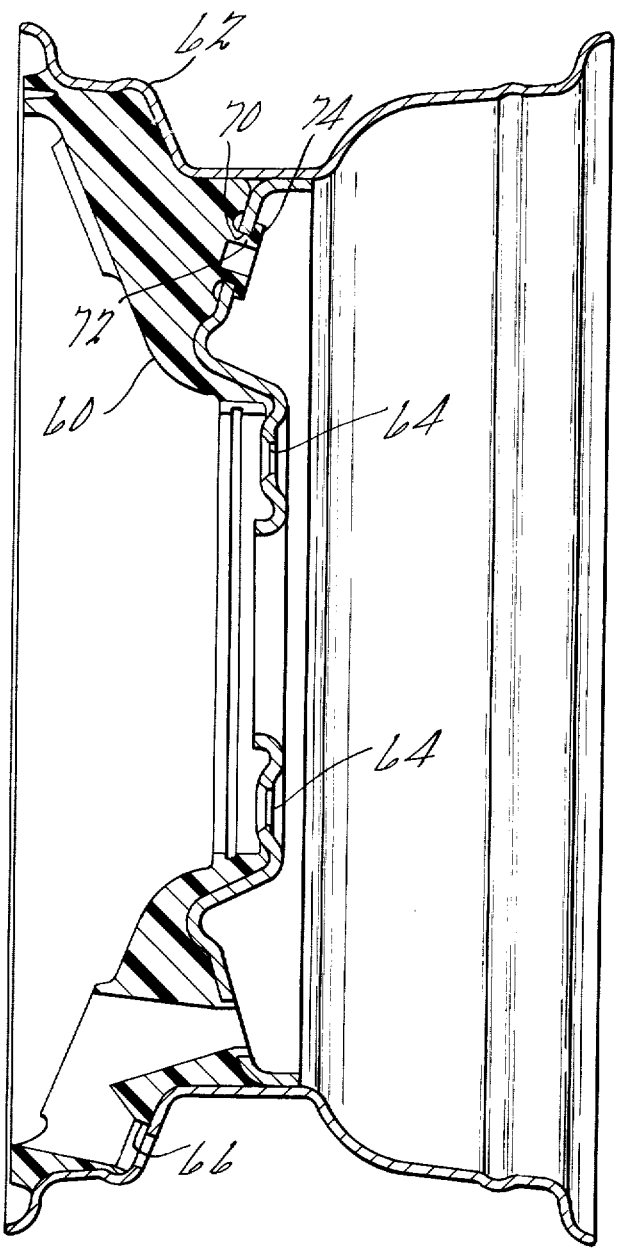
FIG. 16 is an enlarged sectional view taken in the direction of arrows 16—16 in FIG. 15.

FIGS. 15 and 16 illustrate a highly stylized wheel cover 60 embodying principles of the present invention mounted on a wheel 62. Cover 60 is shown as a molded plastic cover having an annular shape whose inside diameter is sufficiently large to provide convenient access to all the bolt holes 64 in the wheel rim. Cover 60 includes an air valve hole 66 and a series of decorative pads 68 arranged in a circle around the cover. It will be noted that the outer periphery of wheel cover 60 is shaped to nest snugly with the wheel. A plurality of openings 70 are provided in the wheel rim, and wheel cover 60 includes projections 72 extending through openings 70 with heads 74 lodging behind each opening 70 to attach the wheel cover on the wheel, the particular attachment being the same as that shown in FIG. 4.

While it will be apparent that the preferred embodiments of the invention disclosed are well calculated to fulfill the objects above stated, it will be appreciated that the invention is susceptible to modification, variation and change without departing from the spirit thereof.

What is claimed is:

1. In a wheel cover secured on the axially outer face of a vehicle wheel, the improvement for mounting the wheel cover on the vehicle wheel comprising: a plurality of projections extending axially inwardly of the wheel cover, said wheel having a plurality of openings registering with said projections, and fastening means disposed on the axially inner side of the wheel and inserted through said openings in the wheel in connection with said projections.

2. The improvement defined in claim 1 wherein said projections are arranged to bear against the axially outer face of the vehicle wheel.

3. The improvement defined in claim 1 wherein the cover includes a portion bearing against the wheel at a location spaced from said projections.

4. The improvement defined in claim 1 wherein the wheel includes a plurality of mounting openings therein via which the wheel mounts to a vehicle axle, said cover including a plurality of clearance openings registering with said wheel mounting openings and providing clearance for fastening the wheel on the vehicle axle entirely independent of the cover supporting means.

5. The improvement defined in claim 4 wherein said cover includes further a plurality of shoulders around said clearance openings which bear against the wheel.

6. The improvement defined in claim 1 wherein said fastening means are integrally fashioned with said projections.

7. The improvement defined in claim 6 wherein said fastening means includes enlarged heads integral with said projections and disposed against the axially inner face of the wheel around said openings.

8. The improvement defined in claim 7 further including intermediate enlargements on said projections which bear against the axially outer face of the wheel around said openings.

9. The improvement defined in claim 7 wherein said enlarged heads and said projections have annular cross sections.

10. The improvement defined in claim 6 wherein said fastening means comprise catches connected to said projections.

11. The improvement defined in claim 10 wherein said catches are provided with inclined leading surfaces which facilitate the radially inward deflection of the catches when the catches are inserted into said openings during application of the cover to the wheel.

12. The improvement defined in claim 6 wherein said fastening means comprise radially expandable means and expanding means for expanding said radially expandible means such that said radially expandible means, when expanded, grip the inner face of the wheel around said openings.

13. The improvement defined in claim 12 wherein said radially expandable means are in the form of tips on said projections.

14. The improvement defined in claim 13 wherein said tips have an annular cross section.

15. The improvement defined in claim 12 wherein said expanding means for expanding the radially expandible means comprise elements inserted within said expandible means.

* * * * *